United States Patent Office 3,480,312
Patented Nov. 25, 1969

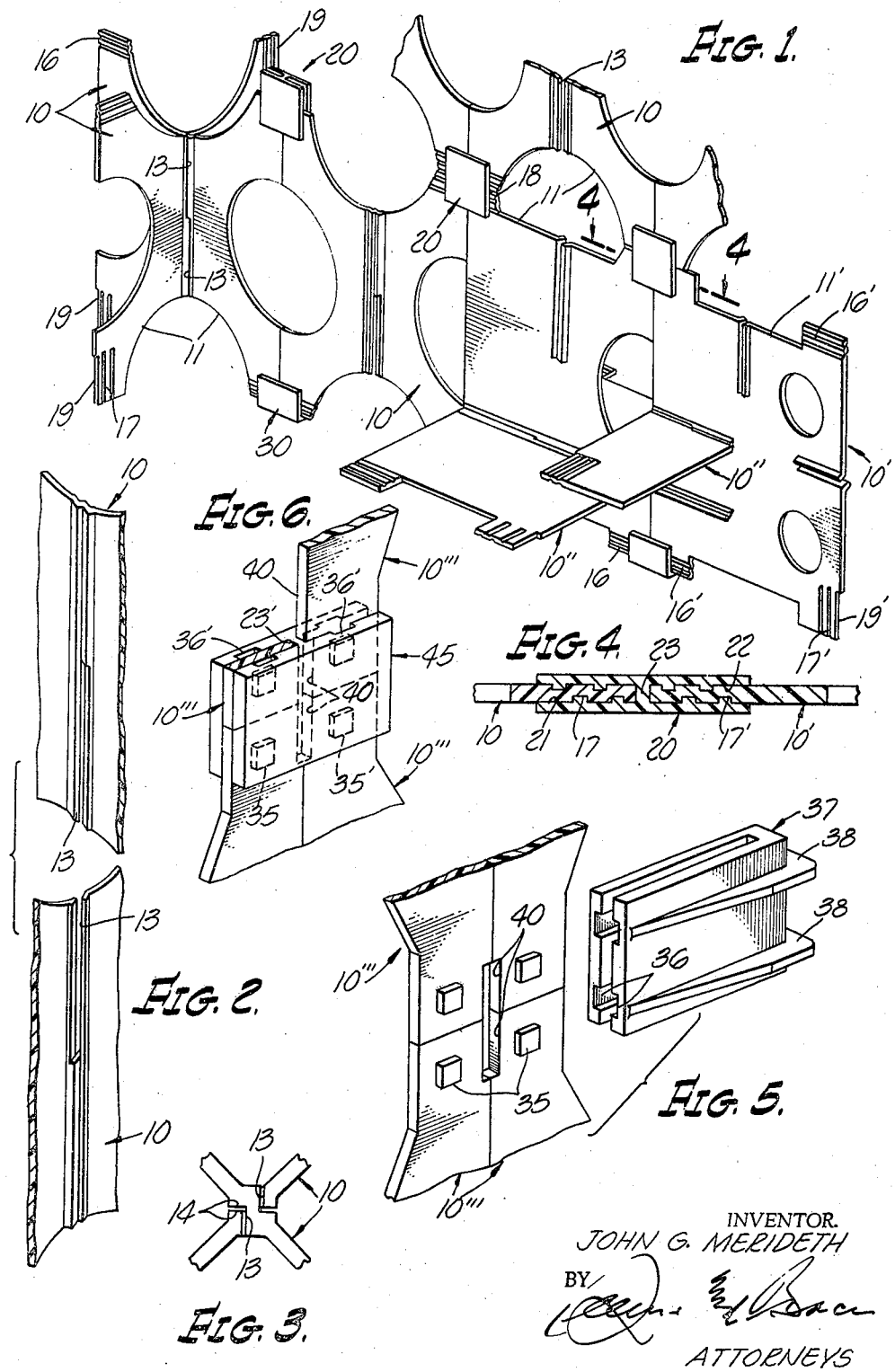

3,480,312
STRUCTURAL ASSEMBLY OF PLAQUE COMPONENTS
John G. Merideth, 5000 W. Imperial Highway, Los Angeles, Calif. 90045
Filed Sept. 18, 1967, Ser. No. 668,525
Int. Cl. F16b 1/00
U.S. Cl. 287—189.36         15 Claims

ABSTRACT OF THE DISCLOSURE

A multiplicity of plaques adapted to be held detachably interlocked in a variety of assembly arrangements by retainer clips shaped complementally to specially shaped surfaces on the faces of the plaques. One diagonal pair of retainer clips is assembled between two or more abutting plaques in a direction at right angles to the assembly direction of another diagonal pair and cooperate with the complementally shaped surfaces to lock the plaques assembled except as respects a separating force applied in a predetermined direction. The interlocking features may comprise mating tongues and grooves or bosses, and having a close sliding fit with complementally-shaped interior surfaces of the retainer clips. Pairs of the plaques are also notched from opposed edges in such manner that the plaques are nestable and supported firmly in planes at right angles to one another.

---

This invention relates to a structural assembly of unusual versatility composed of a multiplicity of similar plaques designed to be held in a wide variety of assembly arrangements by retainer clip means embracing and bridging adjacent corners of the plaques. One diagonal pair of retainer clips is assembled in one direction while those straddling the other diagonal pair of corners are assembled in a direction lying at right angles to the assembly direction of the first set. By reason of this expedient one set of retainers resists disassembly in a direction lying at right angles to the resistance to disassembly provided by the other set. The corner portions of each plaque may be provided with grooves or with protrusions having their edges parallel to and similarly spaced from the corner edges of the plaques. Unitary one-piece retainer clips are formed with long narrow slots sized to have a snug sliding friction fit astride the corners of adjacent plaques and their side walls are grooved to interfit with the grooves or protrusions on the plaques. The number of plaques so secured by a single retainer clip may vary between two and four at the option of the user. Another feature of the plaques is the presence in each of a narrow deep notch opening through one edge and extending medially of the plaque to the central point thereof. Each slot is sized to have a snug sliding fit with the corresponding slot of a second plaque and the edges of the slots are parallel to one another and canted to the plane of the plaque at a suitable angle, as 45 degrees, in which event a pair of telescopically assembled plaques lie at right angles to one another. The plaques proper may be formed in a variety of esthetic designs and contours and used to form screens, pedestals, and a wide variety of artistic and utilitarian assemblies including towers, mazes, shelters, amusement and playground equipment space structures and the like.

It is a primary purpose of this invention to provide a plurality of plaques of generally rectangular configuration but capable of having interior areas formed in a wide variety of decorative patterns, contours, thicknesses and shapes to create esthetic effects of any desired nature and adapted to be rigidly assembled in an endless variety of patterns and arrangements. Desirably, the individual plaques are formed with at least one slot extending centrally along their mid-length and shaped to mate telescopically with the similar slot of another plaque to support the plaques at a preselected angle to one another, such as 90 degrees. Additionally, the plaques may be formed with one or more slots extending inwardly from their lateral edges each mateable with similarly slotted plaques. The resulting assemblies can be employed for a great variety of structures as suggested above.

The diagonally related corners of each plaque are formed with specially shaped contours mating snugly with complementally contoured bridging retainer clips straddling the edges of all adjacent plaque corners and cooperating therewith to hold the associated plaques firmly against disassembly. The same or similar retainer clips are employed on all interior junctions whereas junctions along the periphery of the assembly may be held assembled by retainer clips one-half the size of the others. The retainer clips can be made of any suitable material but preferably are from the same material as the plaques themselves.

Accordingly, it is a primary purpose of the present invention to provide a plurality of structural plaques having irregularly formed corner portions complemental in shape to assembly clips bridging abutting plaque corners and effective to hold adjacent plaques firmly assembled.

Another object of the invention is the provision of a plurality of similar plaques with means cooperating therewith to hold the plaques assembled in a variety of configurations and patterns having interesting and pleasing esthetic values and adapted to serve utilitarian purposes.

Another object of the invention is the provision of a versatile set of plaques and cooperating retainer members capable of being assembled by a novice to provide a rigid structure to meet a particular need or for its artistic and decorative values.

These and other more specific objects will appear upon reading the following specification and claims and upon considering in connection therewith the attached drawings to which they relate.

Referring now to the drawings in which preferred embodiments of the invention are illustrated.

FIGURE 1 is a fragmentary perspective view showing the components embodying the principles of this invention assembled in one particular manner;

FIGURE 2 is an exploded fragmentary view of a portion of two plaques about to be telescoped into internesting assembly;

FIGURE 3 is a fragmentary top plan view on an enlarged scale of a pair of plaques in internested assembly;

FIGURE 4 is a cross-sectional view on enlarged scale taken along line 4—4 on FIGURE 1 and showing one type of retainer clip in assemblied position;

FIGURE 5 is an exploded fragmentary view of a second embodiment of the retainer clip in the process of being assembled astride the corners of four adjacent plaques; and FIGURE 6 is a fragmentary perspective view of another variant of the retainer clip assembled about the adjacent corners of four plaques.

Referring more particularly to FIGURE 1, there is shown a plurality of the invention plaques designated generally 10 embodying features of the present invention and held rigidly in assembled relation by one preferred retainer clip design designated generally 20 and 30. It will be noted that retainer clips 20 are shown interconnecting interior junctions of adjacent plaques 10, whereas retainer clips 30 are designed to embrace peripheral junctions. It will also be noted that the pair of plaques 10, 10 at the left hand end of FIGURE 1 are shown telescoped together along their longitudinal center lines and lie generally at right angles to one another. It will be understood that any selected number of the plaques may be similarly paired according to the wishes of the individual or the dictates of the particular use being made of the assembly and that each such branchout junction may be extended vertically and laterally to either side of the plaque arrangement framentarily illustrated in FIGURE 1.

Each of the rigid plaques 10 is generally rectangular in its overall contour although, as will be apparent from the drawing, portions of the plaques intermediate their corners may be provided with cutouts or notches 11 of any desired shape, thickness, contour or size. For example, a different decorative configuration is embodied in plaque 10′ at the right hand end of FIGURE 1 and these changes can be multiplied in profusion without departing from the principles of the present invention. Additionally, one or all of the plaques may be notched as will be explained more fully presently to mate with and support plaques 10″ lying generally horizontally or at some other desired angle transversely of the vertically arranged plaques and having the same length as plaques 10′. However, they may be of the same width.

To facilitate assembly of plaques 10, 10′ in the aforementioned wide variety of space-forming configurations, each plaque is formed with a narrow slot 13 best shown in FIGURE 2, extending medially thereof from one edge and terminating at the mid-length of the plaque. The details of a typical embodiment of notches 13 are clearly shown in FIGURE 3, it being understood that the width of the slot corresponds generally with the thickness of the material from which the plaques are made and so as to have a close sliding fit with the corresponding slot 13 of a mating plaque. In the interest of greater clarity FIGURE 3 shows the width of slots 13 as being substantially greater than the thickness of the material of the mating plaque. However, in actual practice it is desirable that all contactive surfaces of the slot areas of a pair of assembled plaques have a snug sliding fit and that surfaces 14, 14 bordering the edges of slots 13 lie generally at right angles to the edges of the slots 13 thereby adding very substantially to the strength and rigidity of the telescopically assembled plaques. It will be understood that these mating surfaces extend the full length of the junction between the plaques. Since surfaces 13, 14 lie at right angles to one another and have a close sliding fit, it will be understood that a high strength rigid assembly results.

Referring now more particularly to the plaques at the left hand end of FIGURE 1, it is pointed out that one pair of diagonally spaced corners of each plaque are provided with a plurality of grooves 16, 16 lying at right angles to the similar grooves 17, 17 in the other pair of diagonally spaced corners, it being noted that grooves 16, 16 extend horizontally and that grooves 17, 17 extend vertically. This is an important feature of the invention since it assures that all adjacent horizontal and vertical rows of the plaques are rigidly interlocked by the associated retainer clips bridging all junctions. Each corner may be relieved or notched as indicated at 18 and 19 in a direction extending parallel to the associated set of grooves to accommodate portion 23 of the retainer clips as will be explained more fully presently.

Grooves 16 and 17 and associated notches 18 and 19 accommodate one or the other of the retainer clip units 20, 30. The construction of clips 20 will be best understood by a consideration of FIGURE 4 taken along line 4—4 on FIGURE 1 and showing one of the clips in assembled position to lock the four plaques 10, 10, 10′, 10′. This retainer clip comprises a unitary wafer-like member, here shown as generally square in configuration and formed of metal or molded or cast from any suitable material as, for example, a tough high strength thermoplastic. This clip is formed with a pair of narrow deep notches 21, 22 opening through its opposite lateral edges having their bottoms separated by a web 23 rigidly interconnecting the two side members of the clip. The interior side walls of notches 21 and 22 are formed with grooves complemental in shape with grooves 17, 17′ of the plaques to be joined together and having a snug sliding frictional fit therewith. As herein illustrated by way of example, grooves 16 and 17 are longer than the grooves in the clips. This provides the assembler greater latitude in the mode employed to assemble the components since it permits the clips to be shifted until its length conceals the grooves at one corner of a plaque and later shifted into bridging relation to the aligned grooves of an abutting plaque. It will also be understood that clips 20 are constructed in identical manner and are inter-changeable with one another whether assembled over the vertically extending grooves 17 or the horizontally extending grooves 16.

Clips 30 for peripheral junctions differ in no material respect from clips 20 other than that they are approximately half the size of clips 20 and are U-shaped in configuration as viewed from the end.

In certain cases, it is desirable to provide the interlocked vertical plaques with interlocked transversely extending plaques. This is readily accomplished in accordance with the principles of this invention utilizing the same techniques described above to hold plaques 10″ in assembled position. For purposes of clarity and simplicity only a single plaque 10″ is illustrated assembled between a pair of plaques 10′ in FIGURE 1. However, as many as desired and arranged either in a continuous or discontinuous or other random manner may be employed. Each of plaques 10′, 10″ is provided with transversely extending interlocking slots 13″ having the same functional and structural features described above in connection with slots 13 and 13′. Likewise, it will be understood that the mid-portions of the opposite ends are provided with grooves 17″ to mate with retainer clips 20 or 30 assembled to grooves 17″ via cutouts 11″ in the same manner described above. It will be understood that the horizontally disposed plaques 10″ may be used with or without upright plaques along the opposite lateral edges of plaques 10″ and mated with the adjacent ones of plaques 10′.

Referring now to FIGURE 5, there is shown a modified embodiment of the retainer clip and of the plaque configuration for use therewith. In lieu of the grooves 16, 17 in the corner of the plaques, each corner is provided on its opposite faces with low height square bosses 35 each side of which has a length corresponding to the width of grooves 36 in the U-shaped retainer clip 37. If desired, this clip may be provided with reinforcing ribs 38 along one or more of its exterior faces providing greater strength and adding to the esthetic values of the assembled components. Desirably bosses 35 are so located relative to the corners of the plaque as to permit retainer clips 37 to be inserted in corners diagonally opposed from corners held assembled by clips 45. It will be understood that desirably bosses 35, 35′ are equally spaced from the respective lateral corner edges of each plaque.

Referring now to FIGURE 6, there is shown a retainer clip similar to that shown in FIGURE 5. Each of the plaques 10‴ are provided on their opposite corner faces with square bosses 35′ and with notches 40 corresponding in size and function with notches 18 and 19 in the FIGURE 1 embodiment. Retainer clip 45 embracing the corners of the several plaques is similar to clip 20 except that it has grooves 36′ sized to have a snug frictional sliding fit over bosses 35′. Clip 45 is deeply notched from its opposite lateral edges similarly to clip 20 and the bottoms of these grooves are separated by a connector web 23′ similar to web 23 in clip 20 and slidable along notches 40 during the assembly operation. Clip 45 is employed in diagonally opposed corners from those utilizing clips 37.

From the foregoing it will be recognized that the invention assembly comprises a plurality of plaques which can be compactly packaged for shipment along with a requisite number of the two different types of assembly clips. The user can purchase any desired number of the components and assemble these in a great variety of patterns and rigid arrangements of both a generally planar or a space-framing nature with the plaques lying in many planes parallel and at right angles to one another and to any desired height or width.

The assembly operation is simple and easily performed, it merely being necessary to telescope the central slots 13, 13 of a pair of plaques together in the manner indicated in FIGURE 2 to provide pairs of interlocked plaques or structural components. Two pairs may then be joined together in a vertical tier by first taking the precaution of assembling clips 20 over the vertical grooves 17 of one of the plaques. Thereafter, the vertically aligned grooves of the other plaque are mated with those of the clip as the superimposed plaque pairs are telescoped toward one another. Thereafter the adjacent horizontal grooves of the abutting plaque assemblies are interlocked together by a bridging clip 20 inserted from the ends of grooves 16 opening into cutouts 11 or 11' or, alternatively, from any accessible ends of grooves 16.

If vertical grooves 17 and the associated notches 19 are as long as the clips themselves, and as illustrated in FIGURE 1, then the clips for these junctions may be fully seated to conceal these grooves in one plaque and then shifted to bridge the abutting ends of aligned grooves of the plaques being locked together. In this mode of use, the clips should have a snug sliding fit with the plaque grooves or be bonded or otherwise held in their fully assembled positions. If the vertical grooves in any plaque are only half as long as the clip grooves, then it will be apparent that the clips fully conceal the grooves when assembled and cannot shift from this normal and proper assembly position.

The mode of assembly of the alternate embodiments shown in FIGURES 5 and 6 will be readily apparent from the foregoing description of that employed in connection with FIGURES 1 to 4. Thus the same procedure is followed, the vertical junctions preferably being assembled first following which the clips for the alternate pairs of corners are assembled by movement horizontally and in the manner made clearly evident in FIGURE 5.

From the foregoing it will be recognized that the invention components can be utilized to assemble an endless variety of space-forming structures no two of which need be alike. The resulting structure is strong, rigid and adapted to be oriented in any desired position and employed for innumerable decorative and utilitarian purposes.

While the particular structural assembly of plaque components herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown.

I claim:

1. A structural assembly comprising a plurality of similar generally rectangular plaques assembled in edge-to-edge relation to form a structure of a desired size, each of said plaques being formed adjacent the corners thereof with protrusions on at least one face surface of said plaque adapted to mate with retainer clip means to hold the edges of adjacent plaques assembled to one another, retainer clip means embracing and bridging the corners of one adjacent pair of plaques to hold the plaque assembled, said retainer clip means being formed with at least one deep slot complemental to said protrusions on the corners of said plaques and having a sliding fit astride the adjacent corner portions of said plaques and effective to hold said plaques in edge-to-edge assembled relation.

2. A structural assembly as defined in claim 1 characterized in that said retainer clip means and the protrusions mateable therewith at one diagonally located pair of plaque corners are designed for assembly lengthwise of one parallel pair of lateral edges of the associated plaques and at right angles to the direction of assembly of the retainer clip means for the other diagonally located pair of plaque corners.

3. A structural assembly as defined in claim 1 characterized in that the pair of retainer clip means located at one diagonally related set of plaque corners are movable into and out of assembled relation in the same direction and at right angles to the direction of assembly and disassembly of the pair of retainer clip means for the other diagonally related set of corners.

4. A structural assembly as defined in claim 1 characterized in that said retainer clip means comprises a unitary wafer having opposed lateral edges each provided with a deep narrow slot extending toward the midsection of said wafer, and each of said slots having at least one interior side wall formed with grooves parallel to one another and to the direction of assembly of said clip means astride a pair of adjacent plaque corners.

5. A structural assembly as defined in claim 4 characterized in that said retainer clip means is generally U-shaped and includes a single narrow deep slot opening through all except one edge thereof, and at least one interior side wall of said slot having at least one pair of parallel slots opening through an edge of said retainer clip remote from the non-slotted edge of the clip.

6. A structural assembly as defined in claim 1 characterized in that said protrusions from the surface of the plaque corners are square with pairs of edges parallel to the respective corner edges of said plaques.

7. A structural assembly as defined in claim 1 characterized in that said protrusions from the surface of the plaque corners comprise long shallow grooves having edges parallel to one another and to one edge of the adjacent plaque corner.

8. A structural assembly as defined in claim 1 characterized in that said plaques each include a long narrow slot opening through one edge thereof and extending along one medial axis of the plaque to the center thereof with the opposite longitudinal edge of the slot lying parallel to one another and at an angle to the plane of the plaque, and said slots being sized to mate snugly with one another as the oppositely directed slots of two plaques are telescoped into nested assembly, and said slots cooperating to hold the mated plaques generally at right angles to one another.

9. A structural assembly as defined in claim 1 characterized in that the corner portions of said plaques are formed with parallel grooves along either exterior surface and with the grooves on one face positioned intermediate the grooves on the opposite surface of the same corner.

10. A structural assembly as defined in claim 9 characterized in that the grooves along one set of diagonally disposed corners extend at right angles to the length of the grooves along the other set of diagonally disposed corners.

11. A structural assembly as defined in claim 1 characterized in that at least one parallel pair of edges of said plaque are with cutouts between the adjacent corners thereof, said cutouts being sufficiently deep to permit said retainer clip means to be assembled crosswise of said corners from a starting position partially within said cutouts.

12. A structural assembly as defined in claim 8 characterized in that the opposite lateral edges of said long narrow slots are V-shaped with the surfaces of the V on each side lying at right angles to one another, and the V-shaped surfaces of the slots of a pair of mated plaques lying snugly against one another in the assembled positions of said slots.

13. A set of high strength mutually cooperable space-forming structural components comprising a multiplicity of four sided plaques each having a long narrow slot extending inwardly to the center thereof from the midlength of one edge and sized to internest snugly with the similar slot of another plaque, and cooperable therewith to hold a pair of plaques assembled criss-cross fashion, a multiplicity of retainer clips each formed with a pair of wide parallel legs rigidly secured together and each having a plurality of parallel grooves opening through the inner surface of at least one of said parallel legs, one diagonal pair of corners of said plaques being formed with surfaces to set snugly in the grooves of said retainer clip means when the latter is shifted across the plaque corners and parallel to one pair of plaque edges, the other diagonal pair of plaque corners being formed for mating with the grooves of other retainer clip means when the latter is shifted across the plaque corners and parallel to the other pair of plaque edges, whereby to form a space-forming structure of interlocking pairs of plaques with each pair of plaques internested criss-cross fashion along a medial axis of each.

14. A set of structural components as defined in claim 1 characterized in that at least some of said plaques include a plurality of long narrow slots each opening through a different edge and extending inwardly toward a related opposite edge of the plaque, the opposite edges of a given one of said slots lying parallel to one another and being shaped and sized to mate snugly with a complementally shaped similar slot of another plaque as the oppositely directed slots of two plaques are telescoped into nested assembly.

15. A set of structural components as defined in claim 14 characterized in that all of said plaques are provided with means at the opposite ends thereof for interlocking engagement with retainer clip means having overlapping assembly with the corners of a pair of abutting ones of said plaques.

References Cited

UNITED STATES PATENTS

| | | |
|---|---|---|
| 1,398,852 | 11/1921 | Gilbert. |
| 1,426,087 | 8/1922 | Metcalf _____ 46—31 |
| 2,708,828 | 5/1955 | Pruyn _____ 287—189.36 |
| 2,728,125 | 12/1955 | Wild _____ 24—205.11 |
| 2,996,797 | 8/1961 | Carlile _____ 24—205.11 X |

FOREIGN PATENTS

| | | |
|---|---|---|
| 475,569 | 11/1950 | Canada. |
| 587,898 | 5/1947 | Great Britain. |
| 405,955 | 1/1966 | Switzerland. |

RAMON S. BRITTS, Primary Examiner

U.S. Cl. X.R.

46—31; 52—584